March 8, 1966  E. A. HOLLIS  3,238,766
GAGING DEVICE

Filed June 3, 1964  2 Sheets-Sheet 1

INVENTOR
Everett A. Hollis

BY Rockwell and De Lio
ATTORNEYS

March 8, 1966  E. A. HOLLIS  3,238,766
GAGING DEVICE

Filed June 3, 1964  2 Sheets-Sheet 2

INVENTOR
Everett A. Hollis

BY Rockwell and De Lio
ATTORNEYS

United States Patent Office 3,238,766
Patented Mar. 8, 1966

3,238,766
GAGING DEVICE
Everett A. Hollis, Granby, Conn., assignor to Pratt & Whitney, Inc., West Hartford, Conn.
Filed June 3, 1964, Ser. No. 372,244
4 Claims. (Cl. 73—37.5)

This invention relates to gaging devices and more particularly relates to gaging devices of the type which utilize fluid at a pressure greater than atmospheric as a gaging medium, and as a means of measuring deviation of a workpiece from a desired or standard size.

A gaging system of a type which may utilize a gaging device or head embodying the invention is relatively simple and well known to those skilled in the art. In one system, known as a back pressure system, air under pressure from a supply source is passed through a pressure regulator and a variable restriction. From the restriction, the air is conveyed to the inlet end of a gaging head or device. A pressure indicator connected between the restriction and the gaging device measures the change in pressure when a workpiece is gaged.

In the present invention the gaging head has a bore arranged to receive therein a cylindrical portion of a shouldered part and provide a seat for the shoulder of the part, so as to align the axis of the part with the axis of the bore. The cylindrical portion is disposed within a gaging bore, and the clearance between the cylindrical portions and gaging nozzles determines the variation in the inlet pressure. The sidewalls defining the bore and the surface of the cylindrical portion provide a throttling action which affects the back or inlet air pressure.

This invention provides a new and improved gaging device of the type described which provides a means of gaging or checking the outside diameters on shouldered workpieces to within a very close distance from the shoulder, and performs such measurements accurately and with speeds consistent with relatively high production rates. A gage embodying the invention is quite simple in construction and may readily be disassembled for cleaning, and easily reassembled.

Accordingly, an object of this invention is to provide a new and improved gaging device of the type described.

Another object of this invention is to provide a new and improved gaging device for checking the outside diameters on shouldered workpieces to within a very close distance of the shoulder.

A further object of this invention is to provide a gage of the type described which is very simple in construction and which may be easily taken apart for cleaning purposes and rapidly and accurately reassembled.

The features of the invention which are believed to be novel are pointed out with particularity and distinctly claimed in the concluding portion of this specification. However, the invention both as to its organization and operation, together with further objects and advantages thereof may best be appreciated by reference to the following detailed description taken in conjunction with the drawings in which:

Figure 1:
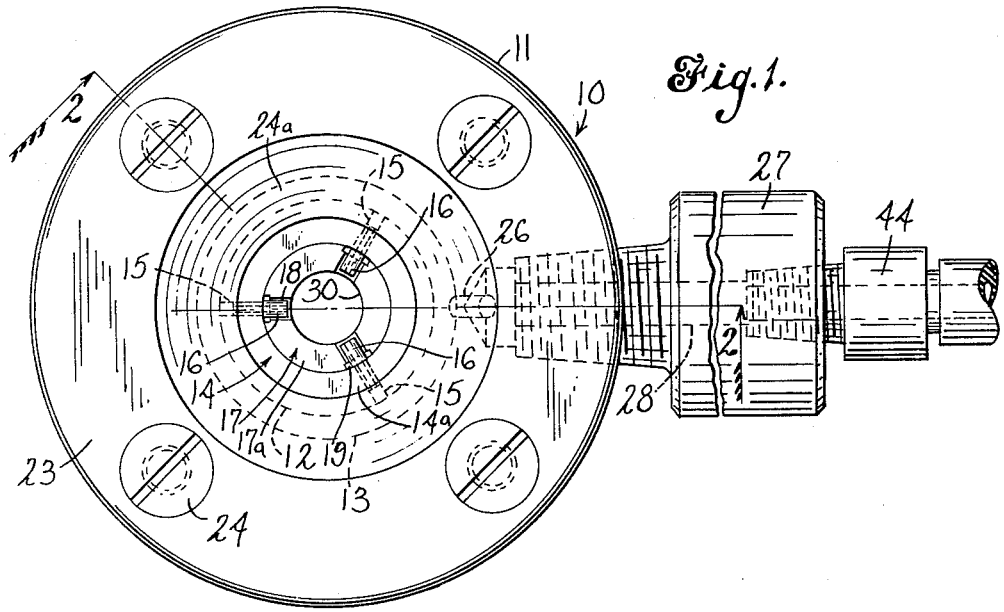
FIG. 1 is a plan view of a gage head embodying the invention.

A gage embodying the invention generally indicated by the reference numeral 10 comprises a main body portion 11 defining a cylindrical bore 12 therethrough. Body portion 11 is further provided with an annular counterbore 13 which cooperates in defining an annular fluid passage as hereinafter described. Received within bore 12 is a sleeve member 14 having a plurality of apertures 15 bored therein and disposed adjacent one end thereof. As illustrated, sleeve member 14 has three apertures therethrough and the axes of these apertures reside in a common plane perpendicular to the axis of bore 12. Each of the apertures 15 receive therein a fluid discharge nozzle 16. The nozzles 16 are secured in the apertures, preferably by tinning and soldering.

Figure 4:
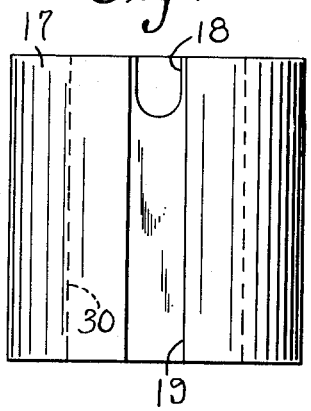
FIG. 4 is a view of a bushing member, a component part of a gaging device embodying the invention, and FIG. 5 schematically illustrates the device of FIGS. 1 and 2 in a pneumatic gaging system.

Received within sleeve 14 is a bushing member 17 having slots 18 therein, each adapted to receive the protruding end of a nozzle 16. The outside diameter of the bushing is grooved along the length thereof as shown in FIG. 4 for reasons hereinafter described. It will be noted that the slots 18 reside within the grooves 19. The bushing 17 is secured within sleeve member 14 with the slots 18 receiving the protruding ends of nozzles 16. Preferably the bushing is cemented into sleeve member 14. The nozzles 16 provide communication between counterbore 13 and the bore of bushing 17.

The gaging faces 14a and 17a of the sleeve and bushing members are ground to a predetermined distance from the axes of the nozzle 16, and reside in a common plane perpendicular to the axis of bore 12.

The assembly of the sleeve member 14, nozzles 16 and bushing 17 are received within bore 12. The length of bore 12 is very slightly less than that of the sleeve to insure that the sleeve member 14 is held securely in place in bore 12. The outside diameter of sleeve member 14 has a close sliding fit with the walls defining bore 12. When sleeve member 14 is inserted in bore 12 the apertures 15 drilled therein, together with nozzle 16, provide communication between the recessed shoulder portion of body member 11 and the interior of bushing member 17. As most clearly seen in FIGS. 2 and 3 annular sealing gaskets 20 and 21 are provided at either end of body member 11. The gaskets 20 and 21 are identical in configuration and each overlie the line of contact between the walls defining bore 12 and the outside surface of sleeve member 14. End caps 22 and 23 having apertures centrally therethrough are securely but removably fastened to the body member 11 by a plurality of bolts 24, threadably received in body member 11. Lip portions 24a on the end caps overlie the line of contact between the body member and sleeve member.

Figure 2:
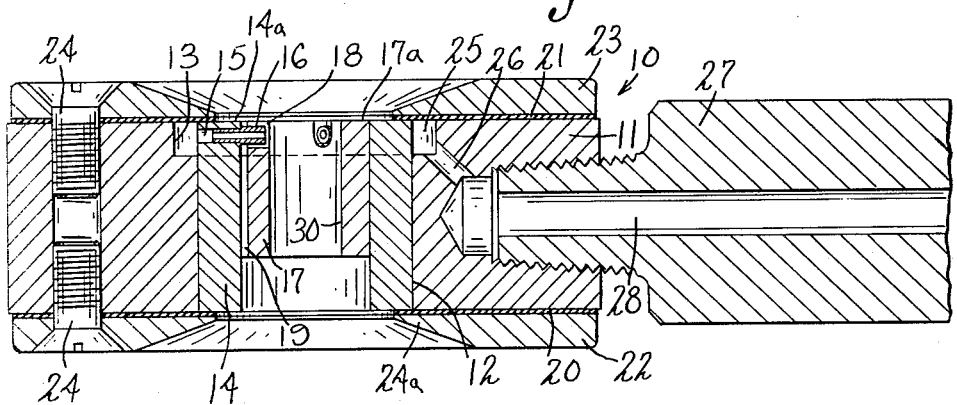
FIG. 2 is a sectional view seen along line 2—2 of FIG. 1.

As most clearly shown in FIG. 2, the sleeve member 14, body member 11 and end cap 23 define an annular air conduit 25. A bore 26 provided in body member 11 provides communication between conduit 25 and an exterior air supply. Body member 11 is drilled and tapped to threadably receive therein a handle or mounting member 27 having a fluid passage 28 therein. Member 27 is adapted to be connected to a source of fluid pressure, and suitable gaging and control devices as hereinafter described.

Operation of the gage as thus far described will now be explained. The part to be gaged which may be the journal portion of a small shaft or spindle 29, shown in broken line, is inserted into the bore 30 defined by bushing member 17 and the shoulder 29a thereof contacts and rests on the gaging faces 14a and 17a of sleeve 14 and bushing 17, respectively.

Fluid under pressure is transmitted through conduit 28 and bore 26 to annular conduit 25 and, hence, discharged through the nozzles 16 towards the journal portion of workpiece 29. As is well known to those skilled in the art, the workpiece to be gaged which is inserted within bore 30, together with walls defining bore 30, prevents the ready discharge of air from nozzles 16, and presents a throttling action on the flow of fluid discharged through nozzles 16. This causes the pressure in conduit 28 to vary. The change in pressure is a measure of the clearance between the walls defining bore 30 and workpiece 29, and, hence, a measure of the diameter of the portion inserted within bore 30.

Figure 5:
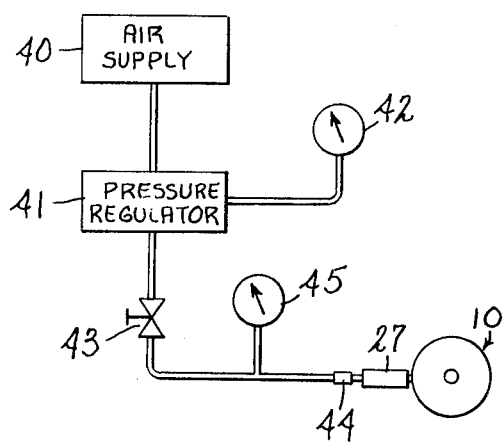

Reference is now made to FIG. 5 which schematically illustrates a gaging system using the subject gage. In the gaging system shown in FIG. 5 compressed air is derived from a supply 40, such as a pump, and supplied to a pressure regulator 41 designed to transmit air at a constant pressure to the remainder of the system. This constant pressure, which may be any suitable value, is indicated on regulator gage 42. Air passing from regulator 41 is admitted through valve 43 to the passage in member 27 through a connector 44 and, hence, transmitted through passage 28 and bore 26 to annular conduit 25, as more clearly shown in FIG. 2.

Figure 3:
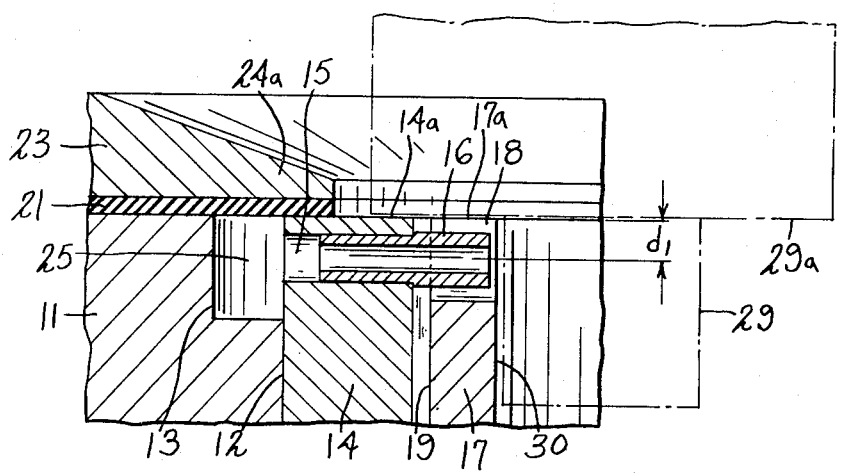
FIG. 3 is an enlarged view of a portion of FIG. 2.

The air introduced into conduit 25 then discharges through the nozzle 16 toward the workpiece being gaged, journal 29, as exemplified in FIG. 3. The back pressure in conduit 28 varies as a function of the diameter of the workpiece inserted into the bore 30 of bushing member 17 and a change in back pressure is indicated by gage 45. The back pressure may also be employed to actuate automatic control or indicating devices or pressure sensitive switches and the like, depending upon the application of the gage 10. While the system illustrated in FIG. 5 in conjunction with the gage 10 is designed to measure back pressure it will be apparent to one skilled in the art that the gage 10 may be utilized in a gaging system which measures air flow. Both the back pressure and flow type gaging systems are well known to those skilled in the art.

The air discharged from nozzles 16 is exhausted between the inside diameter of bushing 17 and the surface of the workpiece being gaged. Additionally, the grooves 19 are provided behind slots 18 to vent exhausted air away from the gaging area if a workpiece being gaged is eccentrically located in bore 30 and tends to prevent air discharge from a nozzle 16.

It may thus be seen that this invention provides a gaging device of simplified construction which allows gaging the outside diameter on shouldered parts within a very close distance from the shoulder. This distance, as illustrated in FIG. 3, may be considered to be the dimension $d_1$ between the gaging surfaces 14a and 17a and the axis of the nozzles 16. For purposes of illustration only, gages constructed in accordance with the invention have been utilized to gage as close as .019" from the shoulder of a shouldered part. The gaging surface defined by the ends 14a and 17a of sleeve member 14 and bushing member 17 insure that the portion of a workpiece to be journaled is aligned with bore 30, if the shoulder of the workpiece is square.

The gage is very simple in construction and may easily be disassembled for cleaning purposes. Should any foreign matter enter and block the air passages, one or both of the end caps may be quickly removed, the sleeve, bushing and nozzle assembly removed and washed out, and the entire gage head reassembled and put back in use within a few minutes.

It will thus be apparent that the objects of the invention set forth above as well as those made apparent are efficiently attained.

While a preferred embodiment of the invention has been set forth for purposes of disclosure, modification of the disclosed embodiment of the invention as well as other embodiments thereof which do not depart from the scope of the invention may occur to those skilled in the art. Accordingly, it is intended to cover in the appended claims all embodiments of the invention and modifications to the disclosed embodiment thereof which do not depart from the spirit and scope of the invention.

What is claimed is:

1. A device of the character described comprising a body member having a cylindrical first bore therethrough and a coaxial counterbore at one end of the bore, gaging means received in the first bore and providing a cylindrical gaging bore therethrough, means for retaining said gaging means in said bore, said retaining means overlying the counterbore and together with said gaging means defining an annular fluid conduit, and means defining a fluid passage in said body member in communication with said annular fluid conduit and arranged to receive fluid from a fluid pressure source, said gaging means comprising a sleeve member having apertures defined therein adjacent one end thereof in communication with said annular conduit, fluid discharge nozzles carried in the apertures and extending radially inwardly therefrom, a bushing member defining said gaging bore mounted within said sleeve member, said bushing member having slots therein opening from one end thereof and receiving the extending ends of said nozzles therein, the end surfaces of said sleeve member and said bushing adjacent said nozzles residing in a common plane perpendicular to the axis of said gaging bore and arranged to receive thereon a shoulder of a part to be gaged, said bushing member having grooves defined in the outside cylindrical surface thereof behind the slots therein along the length of said bushing member.

2. A device of the character described comprising a body member having a cylindrical first bore therethrough and a coaxial counterbore at one end of the bore, gaging means received in the first bore and providing a cylindrical gaging bore therethrough, means for retaining said gaging means in said first bore, said retaining means overlying the counterbore and together with said gaing means defining an annular fluid conduit, and means defining a fluid passage in said body member in communication with said annular fluid conduit and arranged to receive fluid from a fluid pressure source, said gaging means comprising a sleeve member having apertures defined therein adjacent one end thereof, fluid discharge nozzles carried in the apertures and extending radially inwardly therefrom a bushing member defining said gaging bore mounted within said sleeve member, said bushing member having slots therein opening from one end thereof and receiving the extending ends of said nozzles therein, the end surfaces of said sleeve member and said bushing adjacent said nozzles residing in a common plane perpendicular to the axis of said gaging bore and arranged to receive thereon a shoulder of a part to be gaged.

3. A device of the character described comprising a body member having a cylindrical first bore therethrough and a coaxial counterbore at one end of the bore, gaging means received in the first bore and providing a cylindrical gaging bore therethrough, means for retaining said assembly in said first bore, said retaining means overlying the counterbore and together with said gaging assembly defining an annular fluid conduit, a plurality of fluid discharge means adjacent said conduit providing communication between said conduit and the gaging bore, and means defining a fluid passage in said body member in communication with said annular fluid conduit and arranged to receive fluid from a fluid pressure source, said gaging means providing a surface at the end adjacent the counterbore perpendicular to the axis of the gaging bore adapted to receive a shoulder of a part to be gaged.

4. A device of the character described comprising a body member having a cylindrical first bore therethrough and a coaxial counterbore at one end of the bore, gaging means received in the first bore and providing a cylindrical gaging bore therethrough, means for retaining said gaging means in the first bore, said retaining means overlying the counterbore and together with said gaging means defining an annular fluid conduit, a plurality of fluid discharge means providing communication between the counterbore and the gaging bore, and means defining a fluid passage in said body member in communication with said annular fluid conduit and arranged to receive fluid from a fluid pressure source.

References Cited by the Examiner

UNITED STATES PATENTS

| | | | |
|---|---|---|---|
| 2,139,282 | 12/1938 | Poock et al. | 73—37.9 |
| 2,402,142 | 6/1946 | Anderer | 33—178 |
| 2,718,140 | 9/1955 | Aller | 73—37.5 |

FOREIGN PATENTS 793,376  4/1958  Great Britain.

OTHER REFERENCES

The Taft-Peirce Compairator Air Gage, Catalog No. 610, The Taft Peirce Manufacturing Company, November 1952, pp. 11, 12.

LOUIS R. PRINCE, *Primary Examiner.*

FRANK H. THOMSON, *Assistant Examiner.*